(12) United States Patent
Liggett (10) Patent No.: US 7,687,129 B2
(45) Date of Patent: Mar. 30, 2010

(54) SPLICE SEAM

(75) Inventor: Paul E. Liggett, Wooster, OH (US)

(73) Assignee: Lockheed Martin Corporation, Bethesda, MD (US)

(*) Notice: Subject to any disclaimer, the term of this patent is extended or adjusted under 35 U.S.C. 154(b) by 596 days.

(21) Appl. No.: 11/651,243

(22) Filed: Jan. 8, 2007

(65) Prior Publication Data

US 2008/0166514 A1 Jul. 10, 2008

(51) Int. Cl.
*B32B 3/10* (2006.01)

(52) U.S. Cl. .............................. 428/57; 428/58; 428/61; 244/131

(58) Field of Classification Search .................. 428/57, 428/58, 61; 2/275; 156/304.1–304.4; 244/131
See application file for complete search history.

(56) References Cited

U.S. PATENT DOCUMENTS 6,124,010 A * 9/2000 Shih ............................ 428/61

* cited by examiner

*Primary Examiner*—Alexander Thomas
(74) *Attorney, Agent, or Firm*—Renner Kenner Greive Bobak Taylor & Weber (57) ABSTRACT

A splice seam for joining various sections of fabric together is disclosed, wherein the fabric sections are initially delaminated into their constituent plies. The plies associated with each fabric section are then interleaved with each other, and bonded together. The amount of surface area between each interleaved plies can be adjusted as so as to achieve a desired level of load carrying strength between the fabric sections. Additionally, the splice seam may utilize an external and/or internal seam tape to increase the strength of the resultant seam.

6 Claims, 13 Drawing Sheets

SPLICE SEAM

TECHNICAL FIELD

Generally, the present invention relates to seams used to join sections of fabric. More specifically, the present invention relates to a splice seam to join two or more fabric sections together to create an envelope for an airship. Particularly, the present invention is directed to a splice seam that balances applied loads across the seam joint while reducing stress concentrations thereabout.

BACKGROUND ART

Airships, which may also be referred to as blimps, aerostats, dirigibles, lighter-than-air vehicles, and high-altitude airships, have a gas impervious envelope that contains a volume of lifting gas, such as helium. The envelope typically comprises various sections of fabric that are joined by various seams. Because of the size of the airship, the number of seams required are significant.

Figure 1:
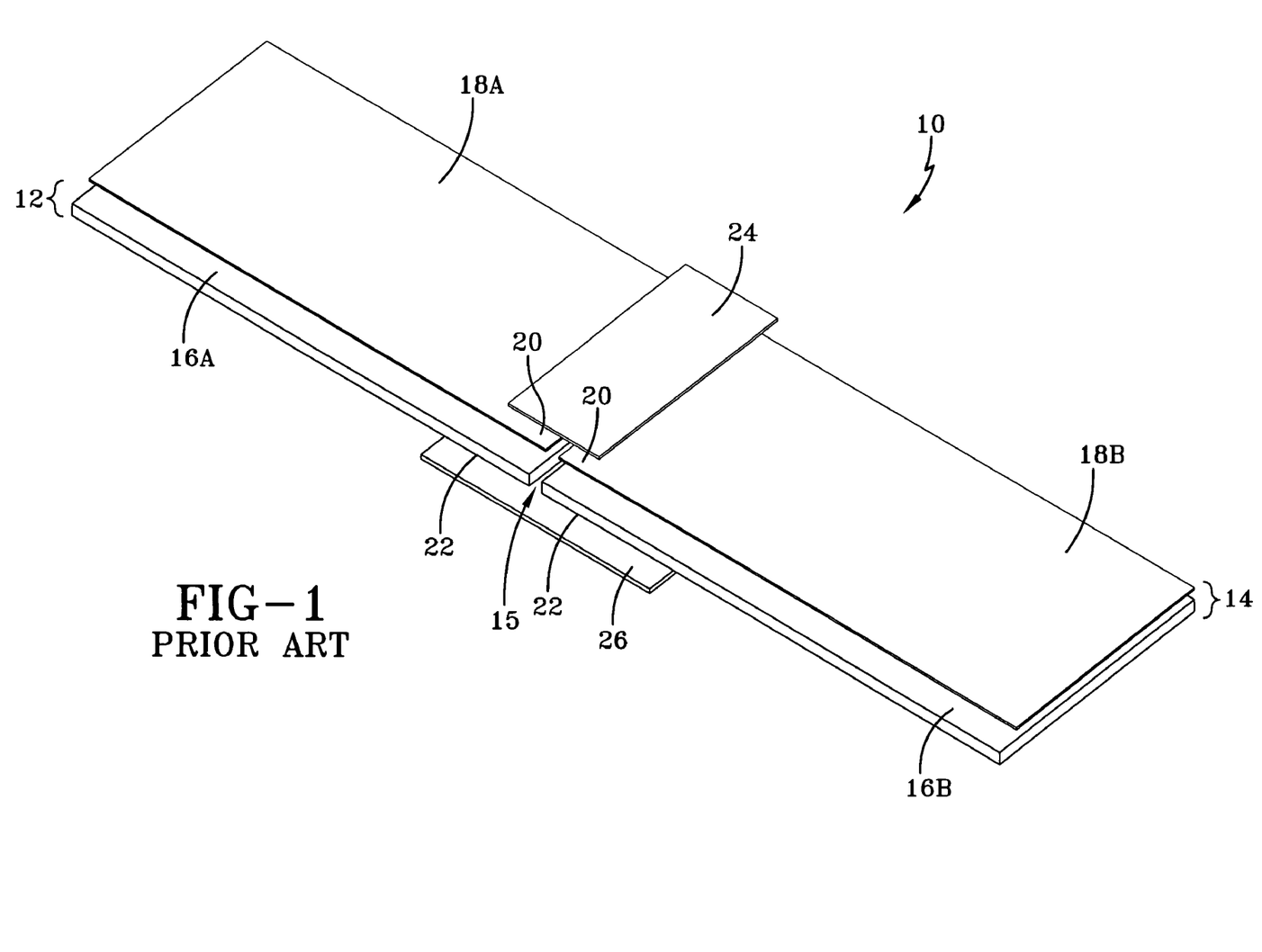
FIG. 1 is a perspective and partial cut-away view of a prior art butt-joint seam.

One type of prior art seam commonly used to form the envelope of most airships is a butt-joint seam, generally referred to by the numeral 10 as shown in FIG. 1 of the drawings. The butt-joint seam 10 has been found to have acceptable durability, and resiliency to accommodate the operating requirements of the airship. The butt-joint seam 10 is formed by providing at least a first and a second opposed sections of fabric 12 and 14, having opposed edges that are positioned adjacent one another so that they abut or so that they are slightly spaced apart so as to form a joint area 15. Alternatively, the fabric edges 12 and 14 may slightly overlap one another to form the joint area 15, however such arrangement is typically avoided. Each of the fabric sections 12 and 14 may be comprised of a straight ply 16A,16B and a film/bias ply 18A,18B that are adhesively laminated together. As used herein, the A suffixes are associated with fabric section 12 and the B suffixes are associated with fabric section 14. When incorporated into the airship, the straight plies 16A, 16B face the interior volume of the envelope, while the film/bias ply 18A,18B face the external environment. Moreover, each of the fabric sections 12,14 provide an outer and an inner bonding surface 20 and 22 respectively. The fabric sections 12 and 14 are joined using an adhesive carrying cover tape 24 and an adhesive carrying seam tape 26, which are adhesively laminated to the outer bonding surface 20 and the inner bonding surface 22 respectively. In other words, the cover tape 24 is adhesively disposed upon the outer surface 20, while the seam tape 26 is applied to the inner surface 22 in a laminated manner. The seam tape 26 distributes loads resulting from forces applied to the seam 10, while the cover tape 24 is provided to protect the exposed edges of the straight plies 16A,16B and the film/bias plies 18A,18B in the joint area 15 from environmental forces, such as UV radiation, while enhancing the lifting gas retention properties of the envelope. Moreover, the outer surface 20 of the film/bias plies 18A,18B, and the cover tape 24 maintain an aluminum coating that serves to reduce the permeability of the lifting gas through the seam 10, and the fabric sections 12,14 that make up the envelope of the airship.

While the butt-seam 10 discussed above utilizes a single seam tape 26, it is advantageous to further increase the strength and durability of the seam 10. One manner to achieve this increased strength, is by replacing the cover tape 24 with another section of seam tape 26, to form a double tape butt joint seam. Unfortunately, the utilization of a second seam tape 26 upon the film/bias plies 18A,18B would not add any appreciable strength to the seam 10, as the film/bias plies 18A,18B to which the second seam tape would be attached is not a load carrying member of the seam 10 in the principal load carrying directions (hoop and axial) of the airship. Therefore, a designer of an airship using conventional seam arrangements is generally limited to the strength achieved by use of a butt-joint that utilizes a single seam tape 26.

Additionally, when the butt-seam 10 is used to join large sections of fabric as in the formation of the airship envelope, significant amounts of seamed area are generated, which due to the use of the structural tape 26, and cover tape 24, imparts unwanted weight to the airship. Further, because the seam tape 26 of the butt-seam 10 is only applied to the inner surface 22 of the fabric sections 12,14 when the butt-seam 10 is formed, loads applied to the seam 10 are distributed across the inner surface of the seam in an unbalanced manner. In addition, because of the unbalanced distribution, the surface of the butt-seam 10 generates stress concentrations, without providing backup for flaws that may exist in the adhesion interface between the joined fabric sections 12,14 about the joint 15.

Therefore, there is a need for a splice seam that does not utilize a seam tape or a cover tape, or eliminates just the cover tape so as to reduce the weight of the seam. Additionally, there is a need for a splice seam that is able to distribute forces from an applied load uniformly across the joint of the splice seam. Furthermore, there is a need for a splice seam that has reduced stress concentrations when a load is applied thereto. Still yet, there is a need for a splice seam that has reduced helium permeability.

SUMMARY OF INVENTION

In light of the foregoing, it is a first aspect of the present invention to provide a system and method for a splice seam.

Another aspect of the present invention is a splice seam comprising a first and a second fabric section, each fabric section comprising a barrier ply and a straight ply, wherein the barrier plies have inner and outer barrier surfaces, and the straight plies have respective internal and external surfaces, and wherein the barrier ply and the straight ply of the second fabric section are disposed between the barrier ply and the straight ply of the first fabric section, such that the outer barrier surface of the barrier ply of the second fabric section is adjacent the inner barrier surface of the barrier ply of the first fabric section, and the internal surface of the straight ply of the second fabric section is adjacent the external surface of the straight ply of the first fabric section, the plies each being bonded to the adjacent ply with adhesive.

Yet another aspect of the present invention is a splice seam comprising a first and a second fabric section, each fabric section comprising a barrier ply and a straight ply, wherein the barrier plies have inner and outer surfaces, and the straight plies have internal and external surfaces, and wherein the barrier ply of the first and second fabric sections are adhesively bonded at a first bonding region, and wherein the barrier ply and the straight ply of the second fabric section are bonded at a second bonding region, and the straight plies of the first and second fabric sections are bonded at a third bonding region.

Still another aspect of the present invention is a splice seam comprising at least two straight plies abutted at their edges to form a joint, the straight plies having an external and an internal straight surface, an internal seam tape having an internal tape surface and an external tape surface, the internal seam tape adhesively disposed across the joint, upon the external straight surface so as to join the straight plies, and at least two barrier plies, wherein the barrier ply is adhesively disposed upon the external tape surface of the internal seam tape, while the second barrier ply is adhesively disposed upon the first barrier ply.

BRIEF DESCRIPTION OF THE DRAWINGS

These and other features and advantages of the present invention will become better understood with regard to the following description, appended claims, and accompanying drawings wherein:

BEST MODE FOR CARRYING OUT THE INVENTION

Figure 2A:
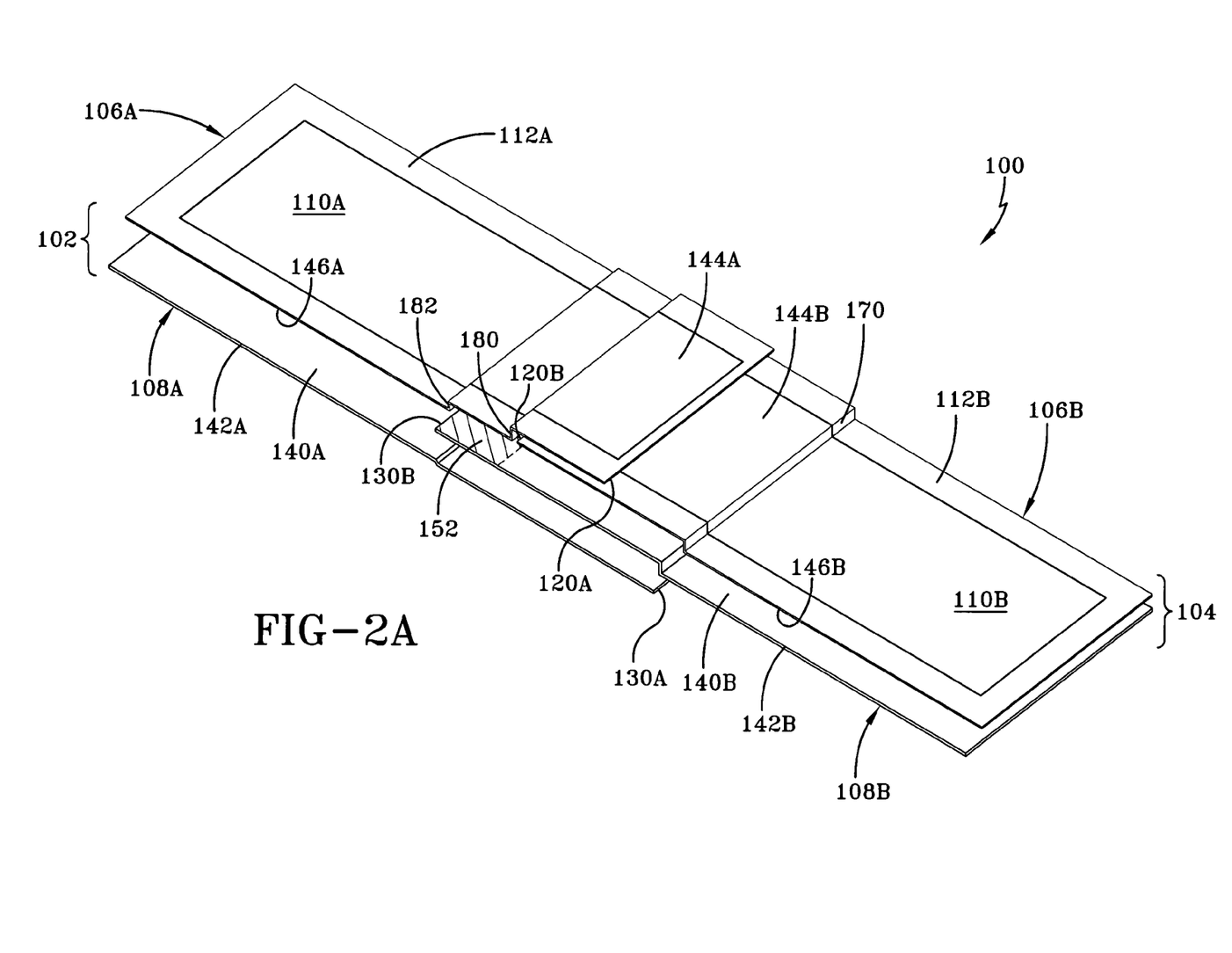
FIG. 2A is an exploded, perspective and partial cut-away view of a splice seam in accordance with the concepts of the present invention.
Figure 2B:
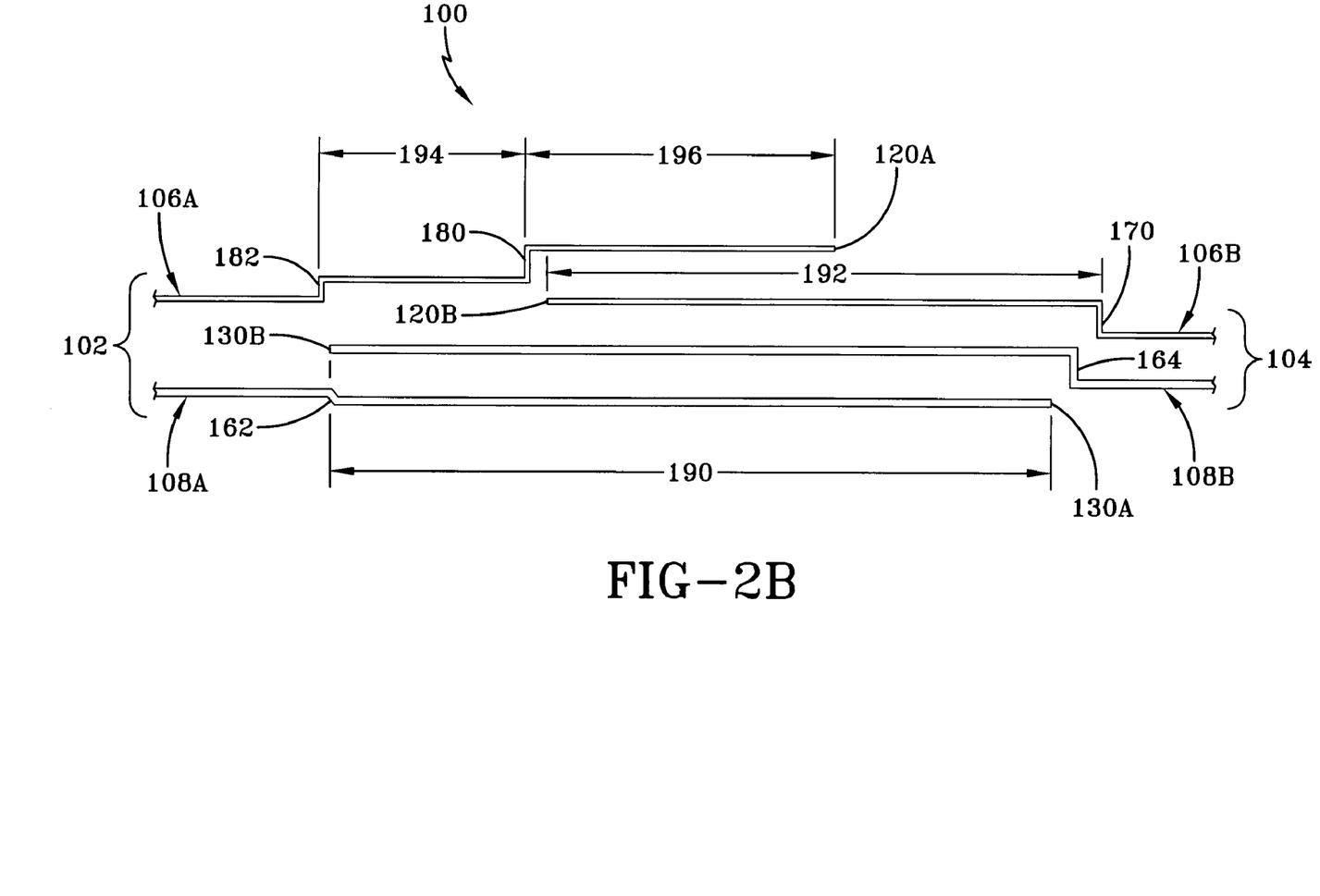
FIG. 2B is an exploded elevational view of the splice seam shown in FIG. 2A according to the concepts of the present invention.

A splice seam in accordance with the concepts of the present invention is generally referred to by the numeral 100 as shown in FIGS. 2A and 2B of the drawings. Prior to discussing the specific configuration of the splice seam 100, a general discussion of the components used thereby will be presented. For the purpose of the following discussion, the use of the term "straight ply" refers to a fabric comprised of warp and fill yarns that are substantially perpendicular to each other, while the term "barrier ply" or "bias ply," as used herein, refers to a fabric comprised of warp and fill yarns that are perpendicular to each other, but are laminated to a straight ply fabric, such that the warp and fill yarns of the bias ply are approximately at a forty-five degree angle to the yarns of the straight ply fabric. However, it will be appreciated that fabrics using woven and non-woven fibers, and provided with or without a bias orientation, could be used. It should also be appreciated that all of the drawings presented herein are exploded views of the seams. The exploded views are used to clearly show the positional relationship of the various seam components. It will be appreciated that the various components of the assembled seams are in contacting relationship with one another in the positional orientations shown. And it will also be appreciated that only partial views of the seams are shown inasmuch as relatively large fabric sections are joined to one another to form an airship envelope or other similar structure.

The splice seam 100 is formed from two sections of fabric 102 and 104. Each fabric section 102/104 comprises a barrier ply 106A/106B, and a straight ply 108A/108B that are adhesively laminated to one another. As used herein, reference character A is used to identify components associated with the fabric section 102, while reference character B identifies components associated with fabric section 104. It should be appreciated that the adhesive used to bond the barrier plies 106A/B and the straight plies 108A/B together may comprise thermoplastic polyurethane (TPU) or any other suitable adhesive, including thermosetting adhesive for example. The barrier plies 106A and 106B comprise a respective barrier film 110A/110B and a respective cloth bias ply 112A/112B that are laminated together by a suitable adhesive, such as thermoplastic polyurethane (TPU) for example. The barrier film 110A/110B may comprise KAPTON® branded film material or other like material that is impervious to lifting gas, while the straight plies 108A/108B and/or the bias plies 112A/112B may comprise any high-modulus, high-tenacity, low elongation fabric, such as fabric formed from VECTRAN® branded yarn for example. Additionally, the general construction of the fabric 102/104 is discussed in U.S. patent application Ser. No. 11/231,569, which is incorporated herein by reference. Continuing, the barrier plies 106A/106B have respective edges 120A/120B, while the straight plies 108A/108B have respective edges 130A/130B. Furthermore, it should also be appreciated that while the straight plies 108A/108B and/or the bias plies 112A/112B may be formed using high-modulus, high-tenacity, low-elongation fabrics, other fabrics having a low-modulus, and/or a low-tenacity, and/or a high-elongation may be employed.

In order to form the seam 100, the fabric sections 102 and 104 are first partially delaminated, whereby the barrier plies 106A/106B, and their respective straight plies 108A/108B are separated from each other, thereby creating various facing surfaces that are used to form the completed splice seam 100. The de-lamination process may be initiated through the application of heat to the fabric sections 102,104 until the adhesive disposed between the barrier plies 106A/106B and the straight plies 108A/108B begins to flow or otherwise melts, allowing each of the plies 106A/B and 108A/B to be individually separated. It is also contemplated that the straight plies 108A/108B, and the barrier plies 106A/106B may be provided individually, without initially being adhesively laminated to form the completed fabric sections 102 and 104. However, the straight plies 108A/108B and the barrier plies 106A/106B are typically adhesively laminated prior to the formation of the various seams discussed herein so as to enhance the efficiency and speed of seam formation. In one aspect, the plies 106A/B, 108A/B may be bonded together using thermoplastic polyurethane (TPU) or any other suitable adhesive, including thermosetting adhesive for example.

Once the fabric sections 102 and 104 have been delaminated and separated, the straight plies 108A/108B expose respective external facing surfaces 140A/140B, and respective internal facing surfaces 142A/142B. Whereas, the barrier plies 106A and 106B expose respective outer barrier surfaces 144A/144B, and respective inner barrier surfaces 146A/146B. Next, the barrier ply 106A and the straight ply 108A of the first fabric section 102 are interleaved with the barrier ply 106B and the straight ply 108B of the second fabric section 104. To achieve this interleaved arrangement, the barrier ply 106B of the straight ply section 108B is modified so that a bonding surface 152 is exposed on the external straight facing surface 140B of the straight ply 108B. This modification of the barrier ply 106B may be accomplished by trimming a section from the edge 120B of the barrier ply 106B, or by heating the adhesive that bonds the barrier ply 106B to the straight ply 108B, and trimming the edge 120B of the barrier ply 106B away from the edge 130B of the straight ply 108B so as to expose the bonding surface 152. Next, the barrier ply 106A and the straight ply 108A of the first fabric section 102 are separated allowing the barrier ply 106B and the straight ply 108B of the second fabric section 104 to be interposed therebetween. Specifically, the interleaved arrangement is configured such that the internal facing surface 142B of the straight ply 108B is adjacent the external facing surface 140A of the straight ply 108A, while the external facing surface 140B of the straight ply 108B is adjacent to the inner barrier surface 146B of the barrier ply 106B. Finally, the seam 100 is completed such that the bonding surface 152 provided by the external straight surface 140B is adjacent the inner barrier surface 146A of the barrier ply 106A, while the outer barrier surface 144B of the barrier ply 106B is adjacent the inner barrier surface 146A of the barrier ply 106A.

As shown in FIG. 2A and more clearly in FIG. 2B, after interleaving the first and second fabric sections 102,104, a number of steps 162, 164, 170, 180, and 182 are formed by the edges 120B and 130A-B of the barrier ply 106B and straight plies 108A,108B. Furthermore, while the various structural steps discussed herein are the result of the edges of the various plies 106A-B,108A-B, it should be appreciated that due to the relative thinness of the barrier plies 106A,106B and the straight plies 108A,108B, that the presence of the various steps in an actual seam are generally not physically apparent. Continuing, the relative spacing between various step regions and edges (i.e. overlap) define the amount of bonding strength that is created between the first and second fabric sections 102 and 104. Thus, when the barrier plies 106A/106B and the straight plies 108A,108B are interleaved as discussed, each of the plies 106A-B,108A-B may be laterally arranged with respect to their steps 162,164,170,180,182, and edges 120A/B and 130A/B in order to achieve the desired level of bonding between the fabric sections 102,104. As such, the distance between the edge 130A and the edge 130B defines a bonding region 190 between the straight plies 108A and 108B. Similarly, the distance between the edge 120B and the step 170 defines another bonding region 192 between the straight ply 108B and the barrier ply 106B, while the distance between the step 182 and the step 180 define a bonding region 194 between the straight ply 108B and the barrier ply 106A. Finally, the distance between the step 180 and edge 120A define a bonding region 196 between the barrier plies 106B and 106A. As is apparent from FIGS. 2A and 2B, the distances established by each bonding region 190-196 may be laterally adjusted so as to achieve the desired bonding strength between the first and second fabric sections 102 and 104.

Once the plies 106A/B and 108A/B have been oriented in the manner discussed, they are bonded together at their bonding regions 190-196. However, because the barrier plies 106A,B and straight plies 108A,B that form the first and second fabric sections 102,104 have been previously laminated with adhesive, additional adhesive is not likely required to be disposed upon each of the facing surfaces of the splice seam 100 in order to form the seam 100. In other words, the residual adhesive from the delamination process is re-used. In one aspect, the width of the bonding region 190 between the straight plies 108A and 108B may be approximately 2.5 inches, but is not required. Because the straight plies 108A and 108B are load carrying plies, the width of the bonding region 190 is dimensioned to provide sufficient force distribution for loads applied thereto. Similarly, the width of the bonding region 196 of the barrier plies 106A and 106B may be approximately 1.0 inch for example. Moreover, because the film/bias plies 106A and 106B are not load carrying, the width of the bonding region 196 may be configured to be less than that of the bonding region 190, which is load carrying.

Figure 3A:
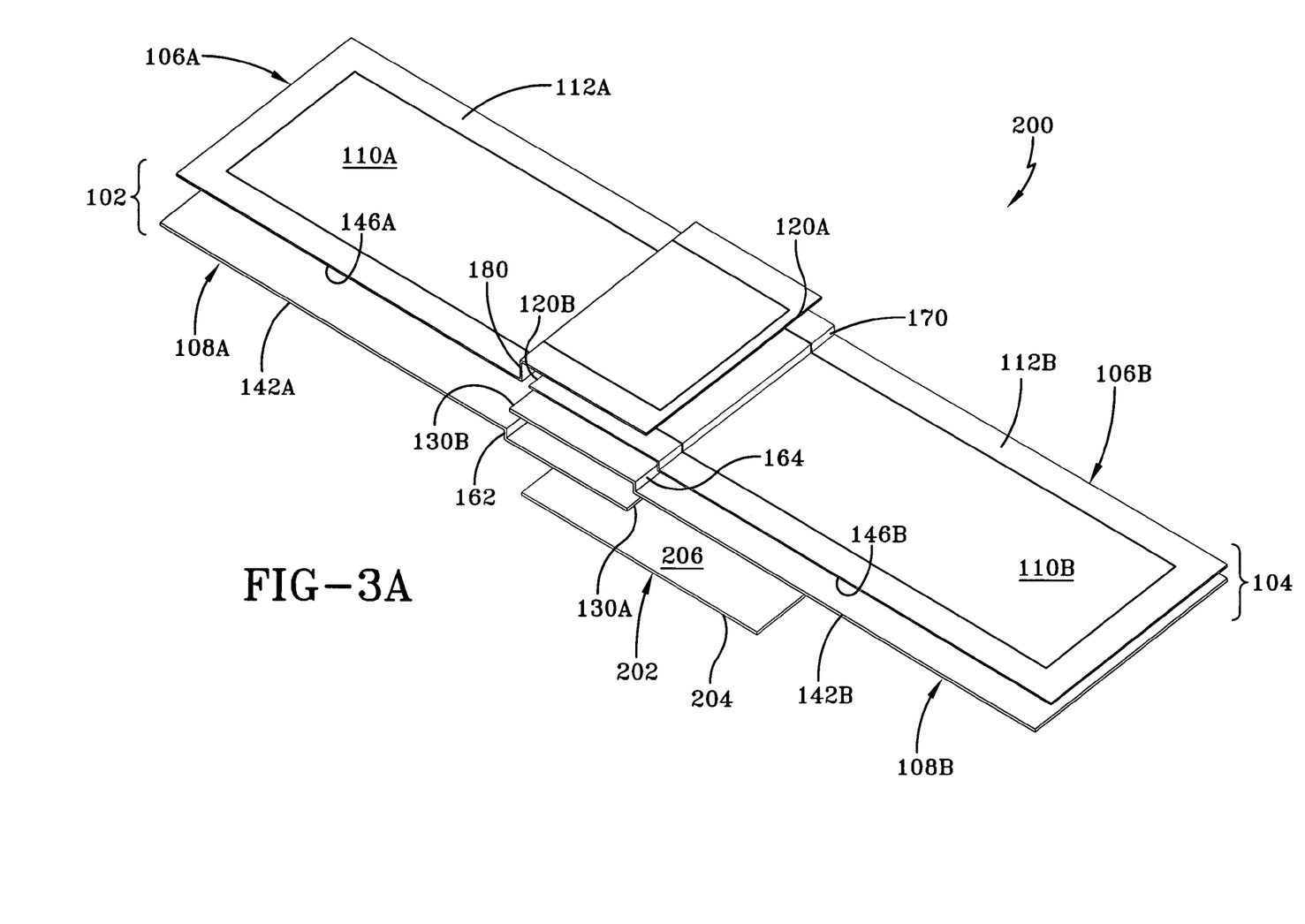
FIG. 3A is an exploded, perspective and partial cut-away view of one embodiment of the splice seam utilizing an external seam tape in accordance with the concepts of the present invention.
Figure 3B:
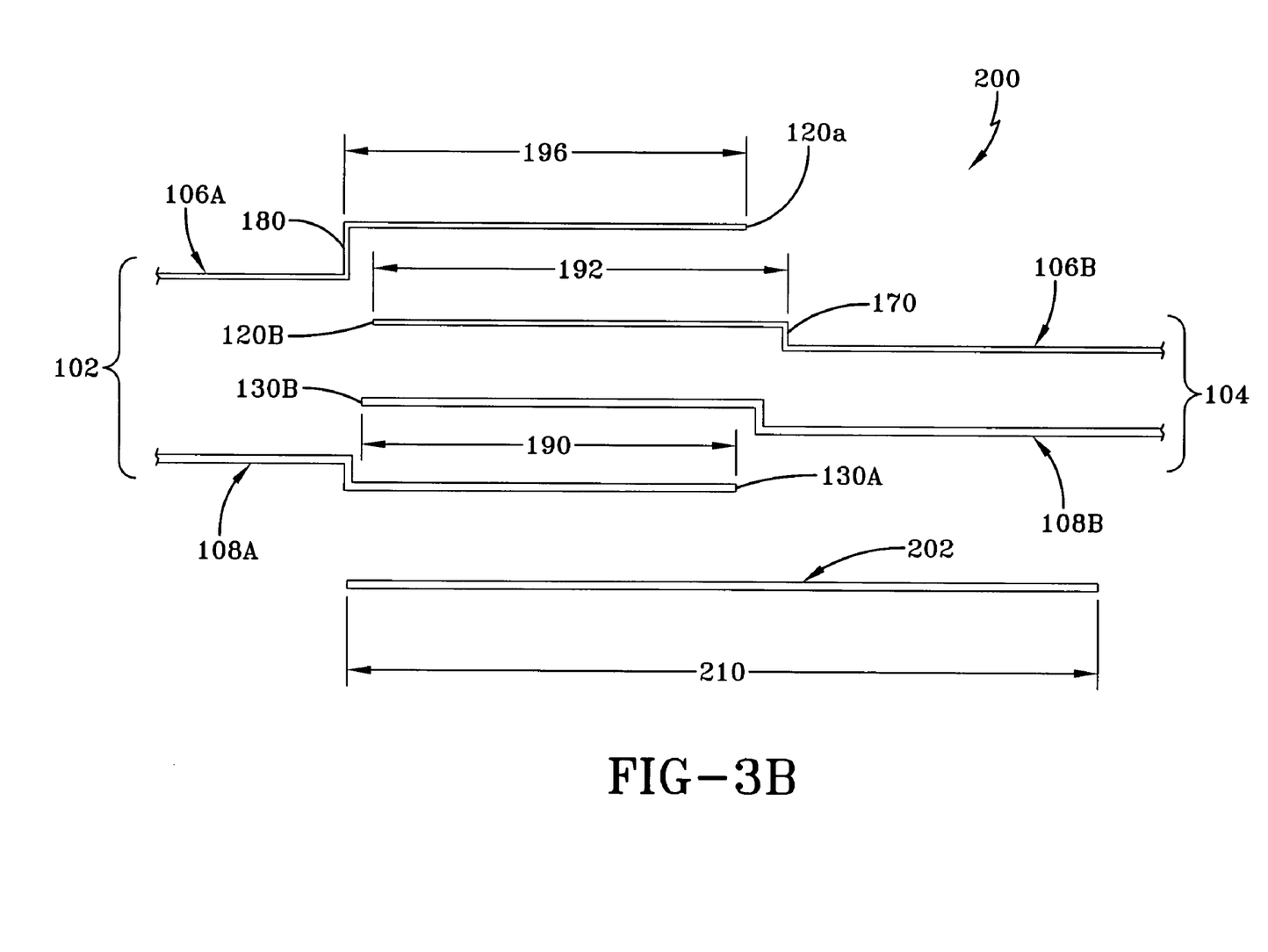
FIG. 3B is an exploded elevational view of the splice seam shown in FIG. 3A according to the concepts of the present invention.

In another aspect of the present invention, an alternate splice seam designated generally by the numeral 200 is shown in FIGS. 3A and 3B of the drawings. The splice seam 200 is substantially the same as the splice seam 100, with the exception that the edge 130B does not extend beyond the edge 120B of the barrier ply 108A, and that an external seam tape 202 is introduced. The seam tape 202 has an internal and external tape surface 204 and 206 respectively, and may comprise the same fabric that comprises the straight plies 108A/108B, however any material suitable for forming the envelope of an airship may be utilized. The external tape surface 206 of the external seam tape 202 is adhesively disposed in a laminated manner upon the internal facing surface 142A and 142B of both straight plies 108A and 108B, such that the central midline of the tape 202 is aligned with the edge 130A of the straight ply 108A. Because the edges 120B and 130B of the barrier ply 106B and the straight ply 108B are aligned with each other, the bonding region 194 and bonding surface 152 shown in FIGS. 2A and 2B are not needed. A bonding region 210, defined by the width of the external seam tape 202, is created between the external seam tape 202 and the straight plies 108A and 108B. Such an orientation of the external seam tape 202 serves to provide additional bonding strength between the straight plies 108A and 108B, over that of seam 100, while evenly balancing forces applied to the seam 200 between each straight ply 108A and 108B. Thus, the splice seam 200 as shown in FIGS. 3A and 3B is capable of providing approximately twice the load carrying capacity than the prior art butt-joint seam as shown in FIG. 1. In one aspect, the bonding region 210 may have a width of about 2.5 inches, for example. While the bonding region 196 may have a width of about 1.25 inches and the bonding regions 190 and 192 may also have a width of about 1.25 inches.

Figure 4A:
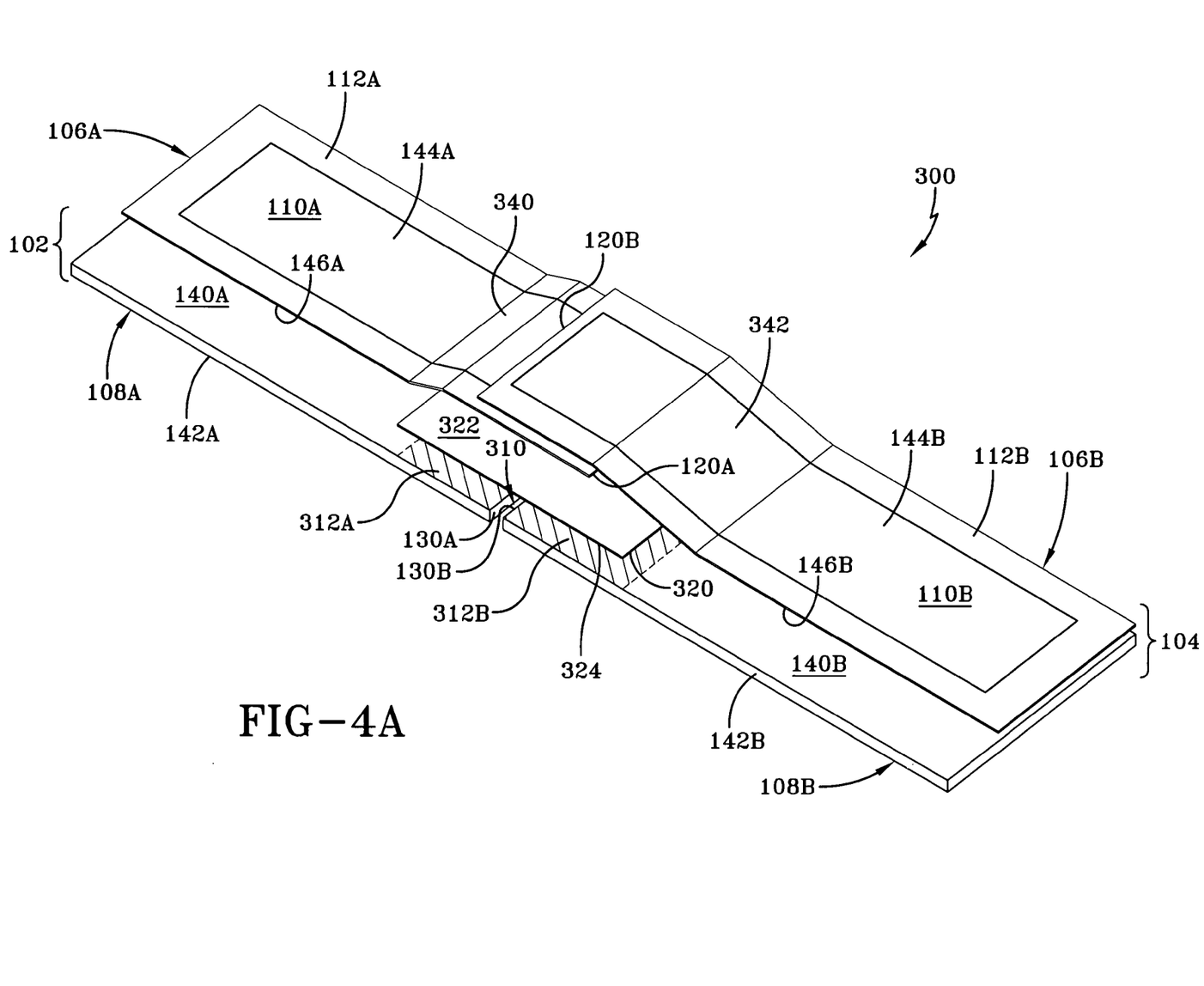
FIG. 4A is an exploded, perspective and partial cut-away view of another embodiment of the splice seam utilizing an internal seam tape according to the concepts of the present invention.
Figure 4B:
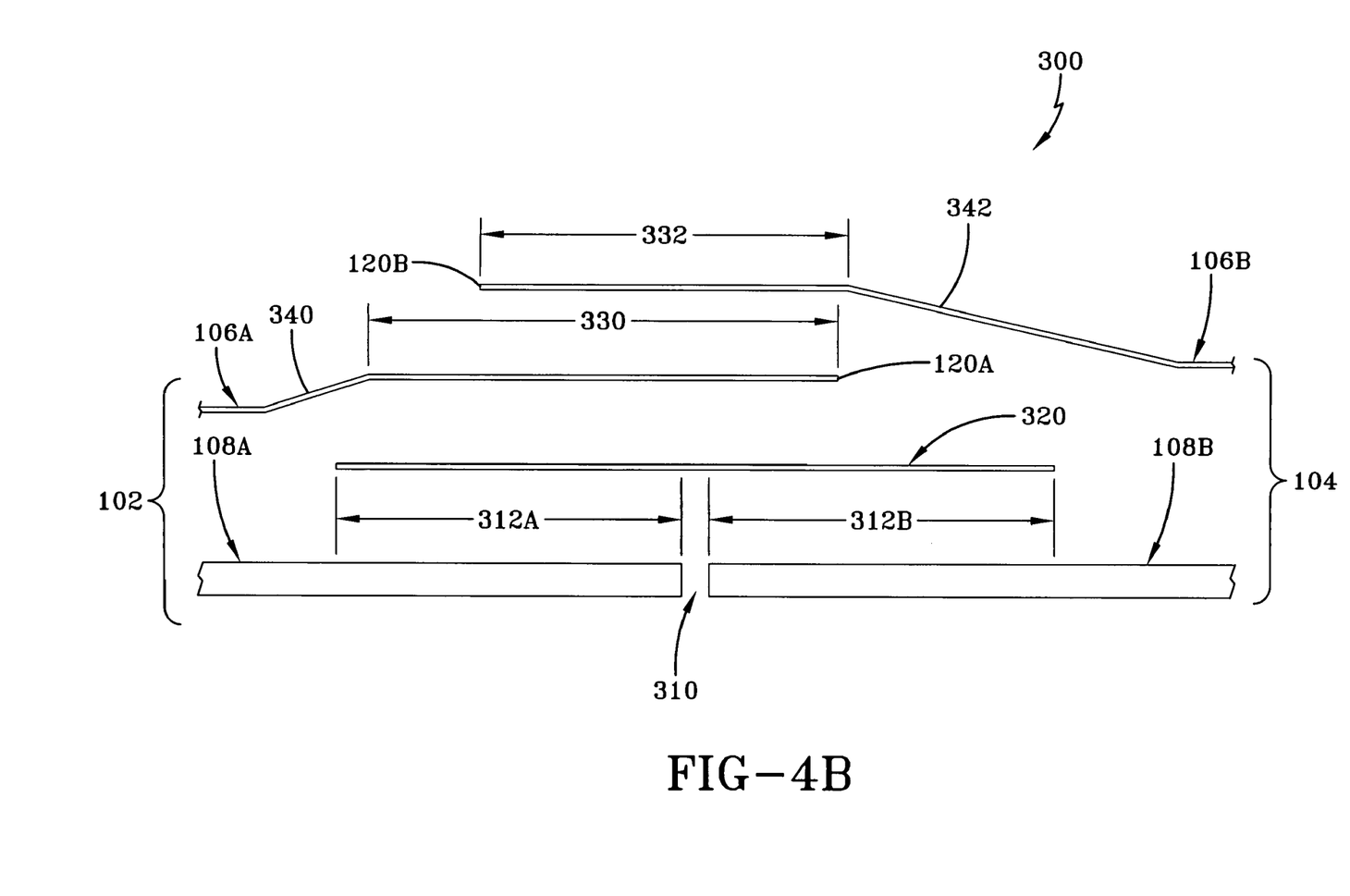
FIG. 4B is an exploded elevational view of the splice seam shown in FIG. 4A according to the concepts of the present invention.

As shown in FIGS. 4A and 4B, an alternative splice seam is generally designated by the numeral 300. The seam 300 may be formed as previously discussed by delaminating the fabric sections 102,104 so as to expose the adhesive that was originally used to bond the plies 106A/B, 108A/B of the fabric sections 102,104 together. Specifically, the splice seam 300 is configured such that the first and second straight plies 108A and 108B are abutted along respective edges 130A and 130B so as to form a joint 310. In other words, each section of fabric 102,104 has opposed edges that are positioned adjacent one another so that they abut or so that they are slightly spaced apart. Defined within the external facing surfaces 140A and 140B on either side of the joint 310 are respective external lamination zones 312A and 312B. To join the straight plies 108A and B, an internal seam tape 320 having an outer tape surface 322 and an inner tape surface 324 are used. Specifically, the outer tape surface 322 of the internal seam tape 320 is disposed upon the lamination zones 312A and 312B so as to join the straight plies 108A,108B together. It should be appreciated that by changing the width of the lamination zones 312A and 312B, various degrees of bonding strength between can be realized between the straight plies 108A/108B and the internal seam tape 320. In addition, the barrier plies 106A, and 106B are oriented, such that the inner barrier surface 146A of the first barrier ply 106A is disposed upon the external tape surface 322 of the internal seam tape 320, while, the inner barrier surface 146B of the barrier ply 106B is disposed upon the outer barrier surface 144A of the first barrier ply 106A to thus complete the seam 300.

Once the barrier plies 106A and B, and the straight plies 108A and B have been disposed upon the internal seam tape 320, a pair of steps 340 and 342 are formed in the first and second barrier plies 106A and 106B. As such, a bonding region 330 defined by the distance between the edge 120A and the step 340 is formed between the barrier plies 106A and 106B, while a bonding region 332 is defined by the distance between the edge 120B and the step 342 is formed between the internal seam tape 320 and the barrier ply 106A. Thus, by changing the width of the bonding regions 330 and 332, various degrees of bonding strength between the first and second fabric sections 102 and 104 may be realized. In one aspect, the seam 300 may be configured so that the internal seam tape 320 may have a width of about 2.5 inches, and the bonding region 332 has a distance of about 1.25 inches.

Figure 5A:
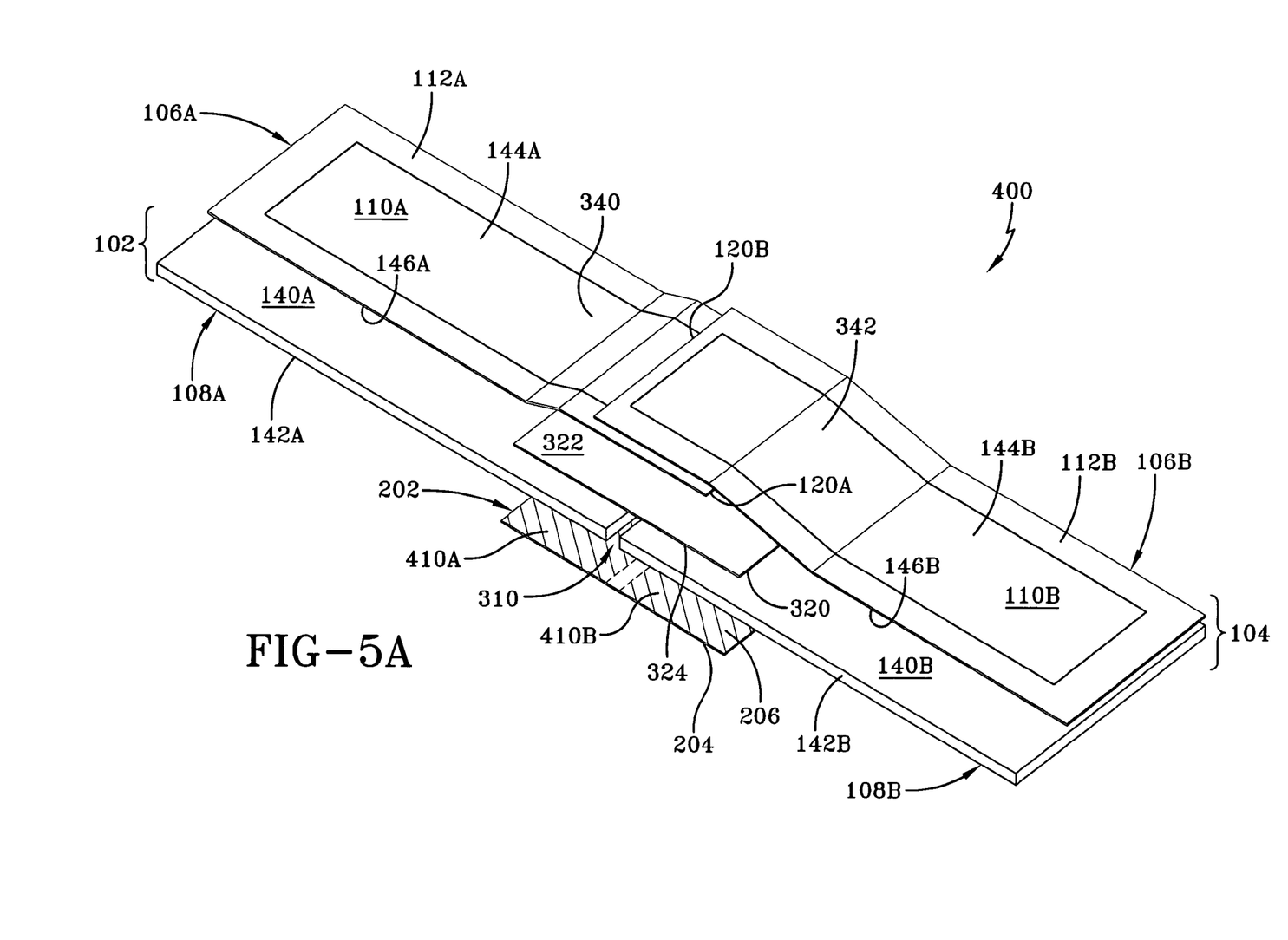
FIG. 5A is an exploded, perspective and partial cut-away view of yet another embodiment of the splice seam utilizing an internal and external seam tape according to the concepts of the present invention.
Figure 5B:
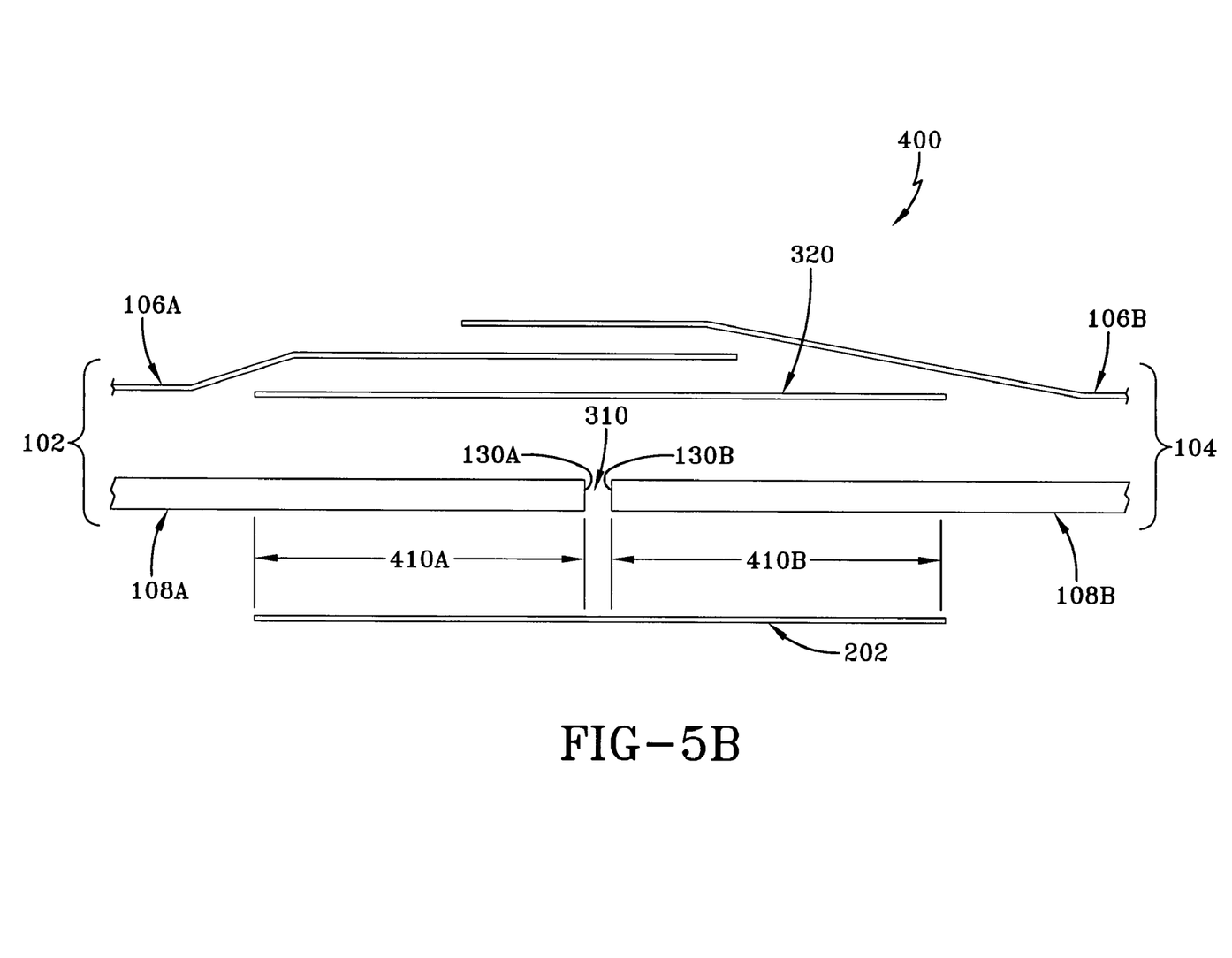
FIG. 5B is an exploded elevational view of the splice seam shown in FIG. 5A according to the concepts of the present invention.

In another embodiment of the present invention, a splice seam generally referred to by the numeral 400 is shown in FIGS. 5A and 5B of the drawings. The splice seam 400 is substantially the same as the splice seam 300 discussed above shown in FIGS. 4A and 4B, except for the addition of the external seam tape 202. Defined within the outer facing surfaces 142A and 142B of the straight plies 108A and 108B on either side of the joint 310 are internal lamination zones 410A and 410B. To complete the seam 400, the external tape surface 206 of the external seam tape 202 is adhesively laminated to the internal lamination zones 410A and 410B so as to join the respective straight plies 108A and 108B. Thus, by utilizing the external seam tape 202 along with the internal seam tape 320, the seam 400 is able to effectively balance applied loads across the joint 310, while increasing reliability and reducing stress concentrations about the joint 310.

Figure 6A:
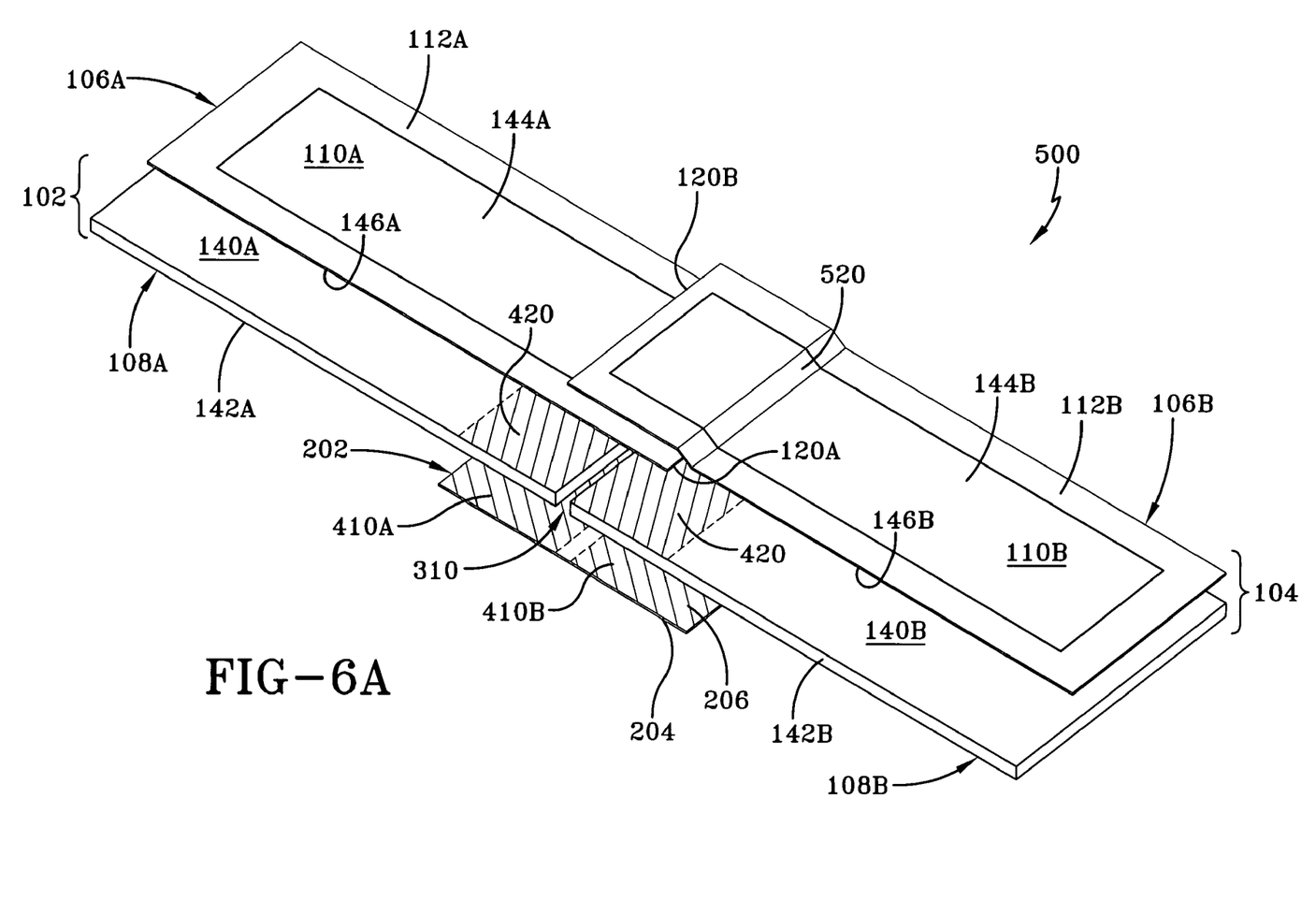
FIG. 6A is an exploded, perspective and partial cut-away view of still another embodiment of the splice seam utilizing a first and a second abutted straight fabric sections and an external seam tape according to the concepts of the present invention.
Figure 6B:
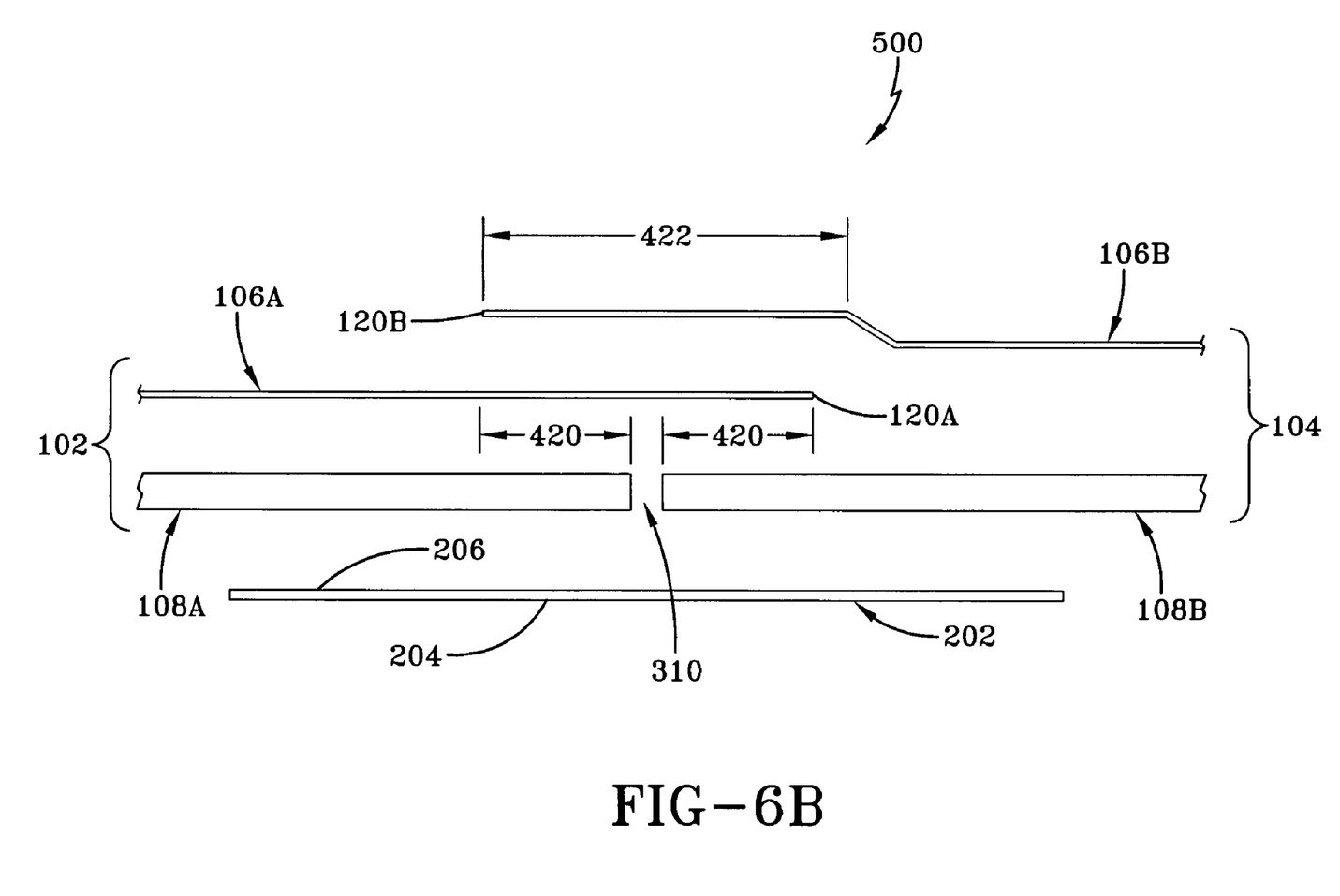
FIG. 6B is an exploded elevational view of the splice seam shown in FIG. 6A according to the concepts of the present invention.

Another embodiment of the splice seam in accordance with the concepts of the present invention is generally referred to by the numeral 500 is shown in FIGS. 6A and 6B of the drawings. The splice seam 500 of the present embodiment is substantially the same as splice seam 400 shown in FIGS. 5A and 5B, but has been modified to utilize only the external seam tape 202, while eliminating the use of the internal seam tape 320. The seam 500 is formed by initially delaminating fabric sections 102 and 104 into their constituent plies 106A/B and 108A/B. Next, the barrier plies 106A/B and the straight plies 108A/B are interleaved, such that straight plies 108A and 108B are abutted about their edges 130A and 130B, and separated by the joint 310. The external tape 202 is adhesively disposed upon the lamination zones 410A and 410B as previously discussed with regard to seam 400 shown in FIGS. 5A and 5B. The barrier plies 106A/B and 108A/B are arranged such that the inner barrier surface 146A of the barrier ply 106A is adjacent the external facing surface 140A and 140B of the straight plies 108A and 108B. And a portion of the outer surface 144A of the barrier ply 108A is adjacent the inner barrier surface 146B of the barrier ply 106B. Additionally, the edge 120A of the barrier ply 106A extends beyond the joint 310, so that a bonding region 420 is created between the barrier ply 106A and both straight plies 108A and 108B. Moreover, distance between the edge 120B of the barrier ply 106B and the step 520 define a bonding region 422 between the outer barrier surface 144A of the barrier ply 106A and the inner barrier surface 146B of the barrier ply 106B.

The external seam tape 202 is adhesively laminated to the straight plies 108A/108B via outer lamination zones 410A-B so as to complete the seam 500. Moreover, the lamination zones 410A-B and 420 may be adjusted to vary the bonding strength between the straight plies 108A/108B and the external seam tape 202. In one aspect, the external tape 202 may be about 2.5 inches wide, while the bonding region 422 may be about one inch in width.

Figure 7A:
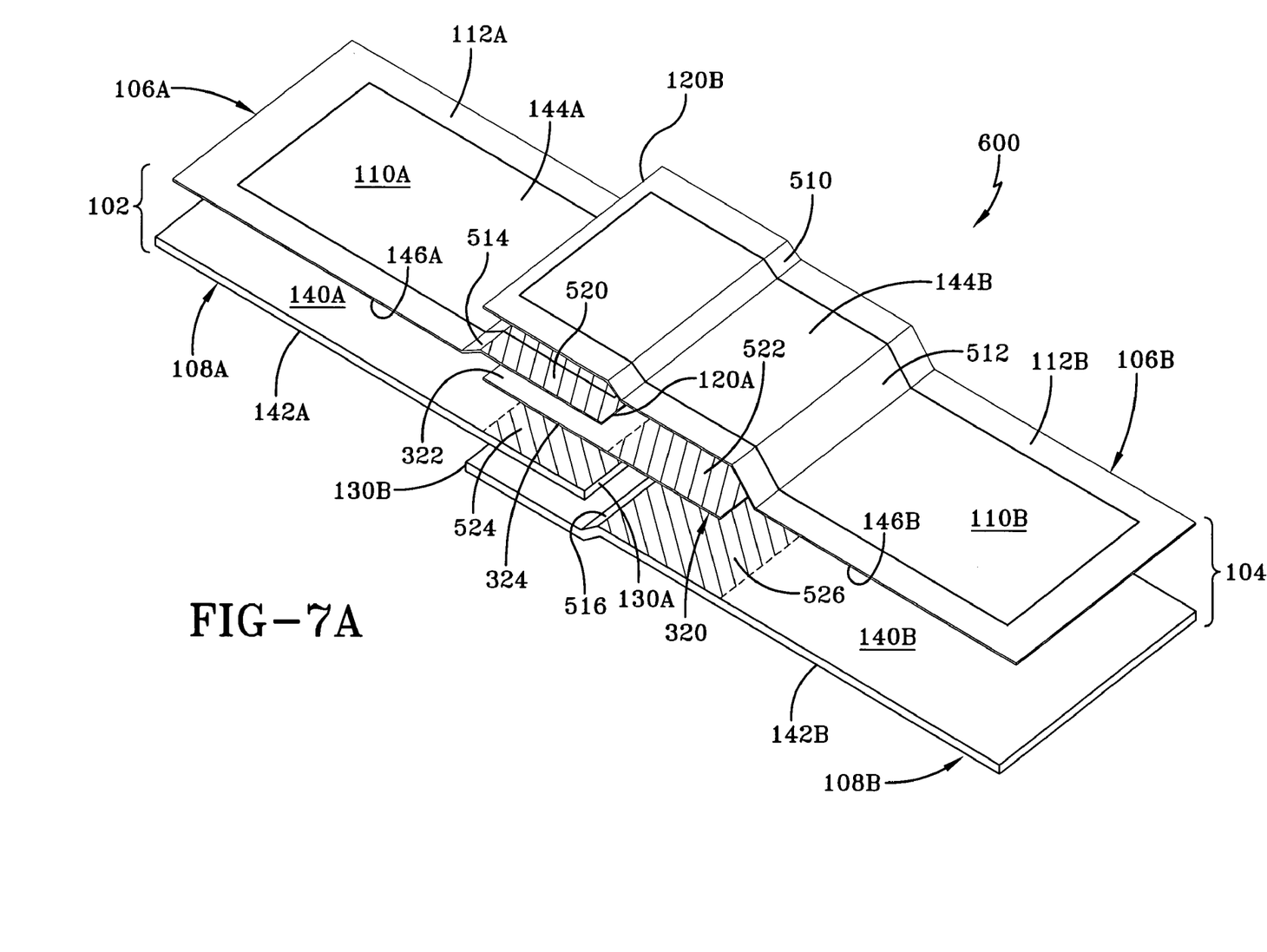
FIG. 7A is an exploded, perspective and partial cut-away view of a further embodiment of the splice seam utilizing an internal seam tape according to the concepts of the present invention.
Figure 7B:
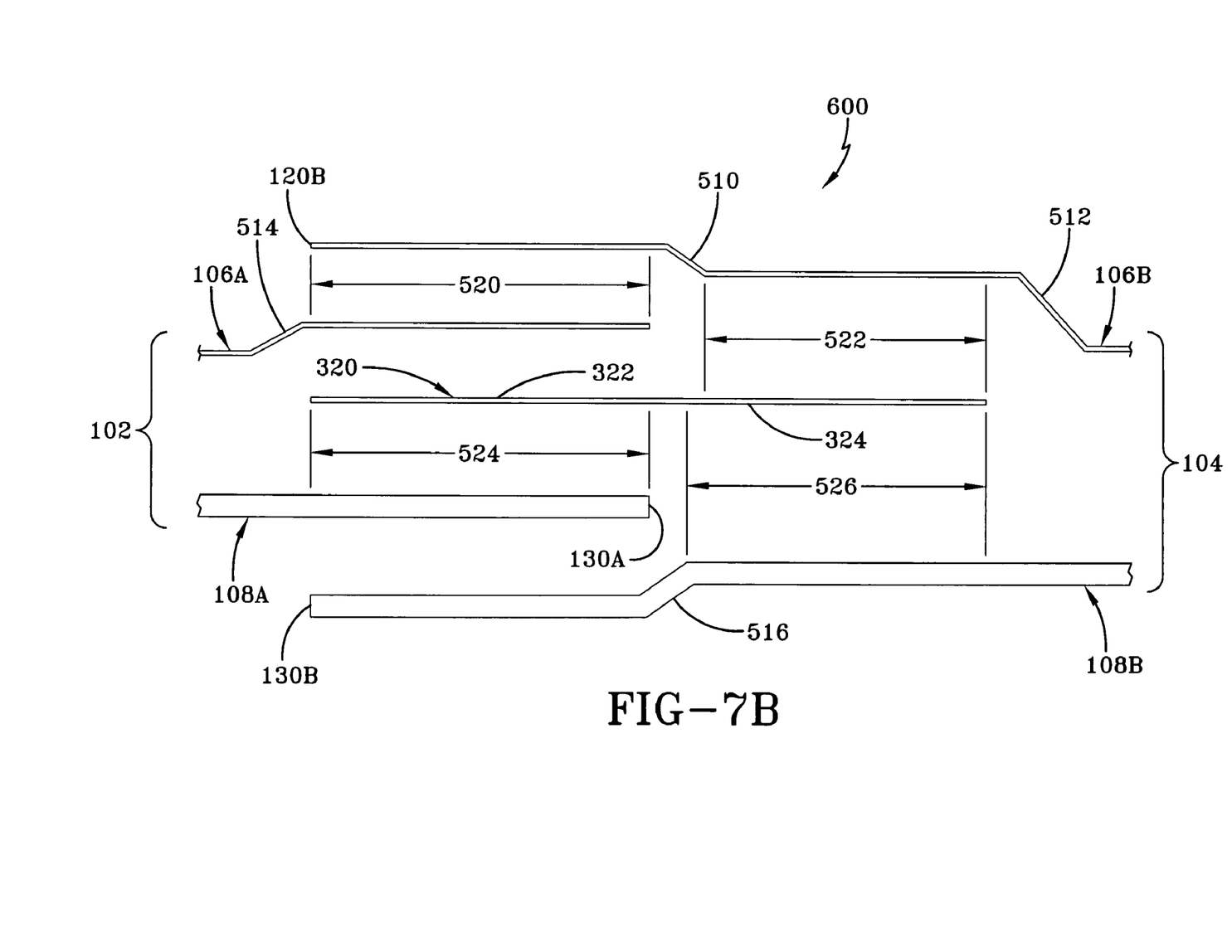
FIG. 7B is an exploded elevational view of the splice seam shown in FIG. 7A according to the concepts of the present invention.

FIGS. 7A and 7B show another embodiment of the splice seam according to the concepts of the present invention, and is generally referred to by the numeral 600. The seam 600 comprises fabric sections 102 and 104, which when delaminated expose various surfaces of the barrier plies 106A,106B, and 108A,108B. Once delaminated, the barrier ply 106A and the straight ply 108A of the fabric section 102 is disposed between the barrier ply 106B and the straight ply 108B of the fabric section 104. Prior to interleaving of fabric sections 102 and 104, the internal seam tape 320 is disposed between the barrier plies 106A-B and 108A-B, such that a proximate midline of the internal seam tape is aligned with the edge 130A of the straight ply 108A. In other words, the interleaved plies 106A-B and 108A-B, and the internal seam tape 320 are oriented so that the outer tape surface 322 is adjacent a portion of the inner barrier surfaces 146A and 146B of the barrier plies 106A-B, and so that the inner tape surface 324 is adjacent a portion of the external facing surfaces 140A and 140B of the straight plies 108A and 108B. Once the barrier plies 106A-B, the straight plies 108A-B, and the internal seam tape 320 are oriented as discussed and shown, they are adhesively laminated together as previously discussed.

The interleaved orientation of the internal seam tape 320 and the various plies 106A/B, 108A/B, and the internal seam tape 320 creates steps 510, and 512 in the second barrier ply 106B, while a step 514 and a step 516 is formed in the first barrier ply 106A, and second straight ply 108B respectively. Furthermore, because the proximate midline of the internal seam tape 320 is generally aligned with the edge 130A of the first straight ply 108A, the internal seam tape 320 is apportioned into four respective bonding regions 520,522,524,526, each defined by various fabric edges 120A-B, 130A-B and steps 510-516. The bonding regions 520 and 522 are oriented between the outer tape surface 322 of the internal seam tape 320, and respective inner barrier surfaces 146A and 146B of the barrier plies 106A/B. Thus, the distance between the edge 120B and step 510 defines the bonding region 520 between the inner barrier surface 146B and the outer barrier surface 146A. Additionally, the distance between steps 510 and 512 defines the bonding region 522 between the inner barrier surface 146B of the barrier play 106B and the outer tape surface 322 of the internal seam tape 320. Bonding regions 524 and 526 are oriented between the inner tape surface 324 of the internal seam tape 320, and respective external straight surfaces 140A and 140B of the straight plies 108A/B. Thus, the distance between the edge 130A of the straight ply 108A and the step 514 defines the bonding region 524 between the external straight surface 140A of the straight ply 108A and the inner tape surface 324 of the internal seam tape 320. In addition, the distance between the step 516 and the step 512 defines the bonding region 526 between the external straight surface 140B of the straight ply 108B and the inner tape surface 324 of the internal seam tape 320. As previously discussed, by varying the distances of the bonding zones 520-526, the amount of bonding strength between the fabric sections 102 and 104 may be modified.

It will, therefore, be appreciated that one advantage of one or more embodiments of the present invention is that a splice seam used in forming an airship may eliminate the use of a seam tape so as to reduce the weight of the resultant seam. Still another advantage of the splice seam according to the concepts of the present invention is that seam tape may be utilized between the barrier ply and the straight ply of the splice seam in order to prevent crossover of seams, such as perpendicular seams utilized to form an envelope of the airship. Use of the various splice seam embodiments disclosed herein in the construction of an airship reduces the helium permeability—less helium leakage—and reduces undesirable stress concentrations. And it is believed that the disclosed splice seams provide about twice the strength as prior art same width, butt seams.

Although the present invention has been described in considerable detail with reference to certain embodiments, other embodiments are possible. Therefore, the spirit and scope of the appended claims should not be limited to the description of the embodiments contained herein.

What is claimed is:

1. A splice seam comprising:
   a first and a second fabric section, each said fabric section comprising a barrier ply and a straight ply, wherein said barrier plies have inner and outer barrier surfaces, and said straight plies have respective internal and external surfaces;
   said at least two straight plies abutted at their edges to form a joint;
   a seam tape adhesively disposed across said joint so as to join said straight plies; and
   wherein said at least two straight plies are in a contacting relationship with said seam tape, wherein edges of said at least two barrier plies overlap one another and each barrier ply extends over said joint.

2. The splice seam of claim 1, wherein said seam tape comprises an external seam tape adhesively disposed across said joint, and upon said external straight surfaces of said at least two straight plies.

3. The splice seam of claim 2, further comprising:
   an internal seam tape adhesively disposed across said joint, and upon said internal straight surfaces of said straight plies.

4. The splice seam of claim 3, wherein said internal seam tape is adhesively disposed across said inner barrier surfaces of said barrier plies.

5. The splice seam of claim 1, wherein said seam tape comprises an internal seam tape adhesively disposed across said joint and upon said internal straight surfaces of said at least two straight plies.

6. The splice seam of claim 5, wherein said internal seam tape is adhesively disposed across said inner barrier surfaces of said barrier plies.

* * * * *